United States Patent [19]

Smith, Jr.

[11] Patent Number: 4,603,878
[45] Date of Patent: Aug. 5, 1986

[54] AUTOMATIC LOCKING AND CENTERING WIDE RANGE TOW HITCH

[76] Inventor: Hoke Smith, Jr., Rt. 1 Box 247, Americus, Ga. 31709

[21] Appl. No.: 673,771

[22] Filed: Nov. 20, 1984

[51] Int. Cl.⁴ .............................................. B60D 1/00
[52] U.S. Cl. ................................ 280/478 A; 267/138; 280/499
[58] Field of Search ........... 280/478 A, 478 B, 478 R, 280/447, 477, 482, 484, 487, 489, 499; 267/138

[56] References Cited

U.S. PATENT DOCUMENTS

| | | | |
|---|---|---|---|
| 1,068,334 | 7/1913 | Goodhue | 280/478 A X |
| 2,820,649 | 1/1958 | DeMarest | 280/478 B |
| 3,279,819 | 10/1966 | Edmonds | 280/478 B |
| 3,353,842 | 11/1967 | Lewis | 280/447 |
| 3,462,173 | 8/1969 | Bock | 280/484 |
| 3,622,182 | 11/1971 | Grosse-Rhode | 280/478 A |
| 4,007,945 | 2/1977 | Casad et al. | 280/478 B |
| 4,114,921 | 9/1978 | Thorell et al. | 280/478 B |
| 4,265,465 | 5/1981 | Deitrich, Sr. | 280/478 A |
| 4,270,767 | 6/1981 | Schilling | 280/477 |

Primary Examiner—John J. Love
Assistant Examiner—Mitchell J. Hill
Attorney, Agent, or Firm—Harvey B. Jacobson

[57] ABSTRACT

A base portion is provided for support from the forward end of a vehicle to be towed or the rear end of a vehicle to be used to tow a second vehicle. An elongated hitch bar assembly is provided including first and second ends and mounting structure mounts the second hitch bar end, intermediate its opposite ends, from the base portion for guided front to rear lengthwise extension and retraction relative to the base portion between forward and rearward limit positions and for angular displacement of the rear hitch bar end about an upstanding axis, shiftable forward and rearward with the second hitch bar end, relative to the base portion between opposite limit positions of angular displacement. Bias structure yieldingly biases the second hitch bar end toward a central position between the front and rear limit positions and first latch structure is operative to releasably latch the hitch bar rear end relative to the base portion in a center position of angular displacement. The first end of the hitch bar assembly is mounted from the second hitch bar assembly end for front to rear shifting and oscillatory movement therewith relative to the base portion and for front to rear lengthwise guided shifting between front and rearward limit positions. Second latch structure is provided for releasably latching the first hitch bar end in a retracted position relative to the second bar end.

12 Claims, 10 Drawing Figures

AUTOMATIC LOCKING AND CENTERING WIDE RANGE TOW HITCH

BACKGROUND OF THE INVENTION

When hitching a trailer to a towing vehicle wide range hitch assemblies may be used to couple the trailing vehicle to a towing vehicle without having to precisely position the towing and trailing vehicles relative to each other. While various forms of wide range hitches heretofore have been provided, most wide range tow hitches incorporate a number of relatively movable components and latch structures which inherently posess clearance with result that a "sloppy" hitch connection is obtained between a towing vehicle and a trailer. Such a "sloppy" connection can amplify trailer "surge" movements and also trailer swaying movements. Accordingly, a need exists for an improved form of wide range tow hitch incorporating means by which operating clearances may be maintained at a minimum.

Examples of wide range tow hitches including some of the general structural and operational features of the instant invention are disclosed in U.S. Pat. Nos. 1,068,334, 2,820,649, 3,279,819, 3,353,842, 3,462,173, 4,114,921, 4,265,465 and 4,270,767.

BRIEF DESCRIPTION OF THE INVENTION

The wide range tow hitch of the instant invention is constructed in a manner whereby fore and aft thrusts or "surge" movements between a towing vehicle and a trailer are dampened and also structure by which lateral "slop" in a wide range tow hitch is yieldingly resisted.

The wide range tow hitch is extendible in a lengthwise direction as well as swingable laterally and is of a type which enables the extendible and swingable components of the hitch to be automatically latched in their trailering positions.

The main object of this invention is to provide an improved wide range tow hitch.

Another object of this invention is to provide a wide range tow hitch including structure by which surge thrusts may be yieldingly resisted.

A further object of this invention is to provide a wide range tow hitch including structure by which lateral thrusts exerted thereon may be yieldingly resisted.

Still another object of this invention is to provide a wide range tow hitch of the type which may be mounted either upon a towing vehicle or a trailing vehicle.

Another object of this invention, in accordance with the immediately preceding object, is to provide a wide range tow hitch including structural features adapting the tow hitch for easy mounting from either a towing vehicle or a trailing vehicle.

A final object of this invention to be specifically enumerated herein is to provide an improved wide range tow hitch in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 10:
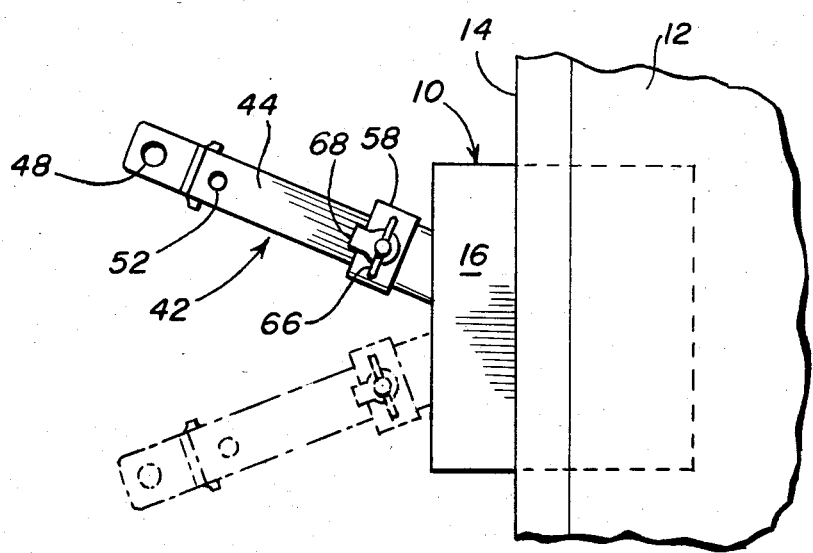
FIG. 10 is a fragmentary top plan view of the wide range tow hitch and with the hitch bar assembly in an extended position and further illustrating the opposite limit positions of lateral swinging of the free end of the hitch bar assembly in solid and phantom lines.

Referring now more specifically to the drawings the numeral 10 generally designates the wide range tow hitch of the instant invention. The hitch 10 may be mounted, in any convenient manner, to the rear of a towing vehicle 12, see FIG. 10, beneath and projecting rearwardly of the rear bumper 14 of the vehicle 12 in any convenient manner, not shown.

Alternatively, the wide range tow hitch 10 may be mounted from and project forwardly of the forward end portion of a vehicle, such as a trailer, to be towed behind a towing vehicle.

The wide range tow hitch 10 includes an outer hollow parallelepiped housing or base portion 16 including top and bottom walls 18 and 20, opposite side walls 22 and 24 and first and second end walls 26 and 28.

The end wall 26 has a horizontally elongated and transversely extending opening 30 formed therein and the top and bottom walls 18 and 20 include transversely extending elongated guide bars 32 and 34 mounted on the inner surfaces thereof spaced slightly inwardly of the second end wall 28. In addition, the top and bottom walls 18 and 20 further include upper and lower pairs of laterally spaced central guide bars 36 and 38 supported from the inner surfaces thereof and yet another guide bar 40 extends transversely of the inner surfaces of the juncture of the walls 20 and 26 and projects slightly above the lower margin of the opening 30.

The wide range tow hitch 10 additionally includes an elongated hitch bar assembly referred to in general by the reference numeral 42 and includes a first end 44 and a second end 46. The second end 46 is tubular and slidably and guidably receives the adjacent end of the first end 44 therein. Accordingly, the first end 44 is extendible and retractable relative to the second end 46 and the extendible end of the first end 44 includes a vertical bore 48 formed through the terminal end thereof for receiving a hitch pin 50 therethrough and a second vertical bore 52 formed therethrough in which to receive a spring biased latch pin 54. Still further, the first end 44 includes an inclined notch 56 in which the latch pin 54 is also receivable in a manner to be hereinafter more fully set forth.

Figure 3:
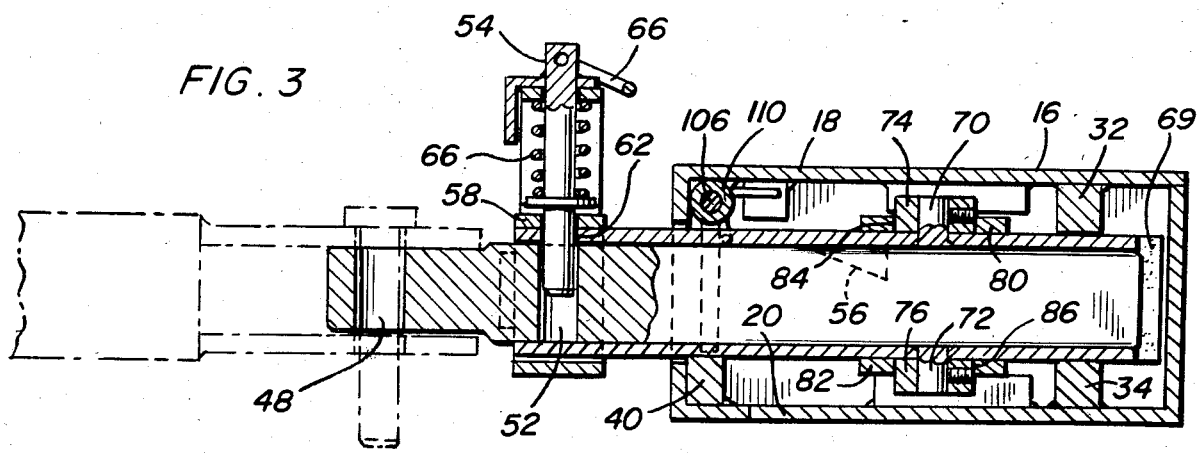
FIG. 3 is a sectional view similar to FIG. 2 but with the hitch bar assembly in a retracted position.

The latch pin 54 is mounted for vertical reciprocation from a mounting bracket 58 provided therefor and supported from the end of the second end 46 in which the first end 44 is telescoped. The latch pin 54 is downwardly biased under the biasing action of a compression spring 60 operatively connected between the mounting bracket 58 and the latch pin 54 and the lower end of the latch pin 54 is projectable downwardly through a bore 62 formed in the upper wall portion of the end of the second end 46 in which the first end 44 is telescopingly received. When the first end 44 is fully retracted in the manner illustrated in FIG. 3 of the drawings, the latch pin 54 projects downwardly into the second vertical bore 54 and thus locks the first end 44 in a retracted position.

When it is desired to extend the first end 44, the latch pin 54 may have an upward pull exerted thereon by the lifting ring 66 pivotally mounted from its upper end in order to upwardly displace the latch pin 54 against the biasing action of the compression spring 60 to retract the lower end of the latch pin 54 from the second bore 52. When the latch pin 54 has been sufficiently upwardly displaced, it may be turned 90° to enable an abutment 68 carried thereby to swing into position in vertical registry with the upper wall 69 of the mounting bracket 58, the abutment 68 thus serving to retain the latch pin 54 in an upwardly retracted position. Then, the first end 44 may be extended relative to the second end 46. Thereafter, the latch pin 54 may be again rotated to swing the abutment 68 out of registry with the top wall 69 to thus allow the latch pin 54 to be again downwardly biased to a position with the lower end of the pin 54 abutted against the upper surface of the first end 44. If the first end 44 is in a fully extended position the lower end of the latch pin 54 will seat in the inclined notch 56 and thus retain the first end 44 in its extended position.

The second end 46 of the elongated hitch bar assembly 42 has a pair of aligned upper and lower upwardly and downwardly projecting pins 70 and 72 mounted thereon and the pins 70 and 72 have cylindrical guide bushings 74 and 76 removably mounted thereon, the bushings 74 and 76 being snugly guidingly and rotatably received between the bars 36 and 38. Further, a pair of transverse upper and lower plates 80 and 82 are secured to the upper and lower surfaces of the second end 46 and have central openings 84 and 86 formed therein through which the bushings 74 and 76 are snugly received.

A pair of tubular spacer members 88 and 90 are anchored between corresponding ends of the plates 80 and 82 and front to rear extending cylindrical rods 92 and 94 are secured through the spacer members 88 and 90 and project both forwardly and rearwardly thereof. The rear ends of the rods 92 and 94 have resilient abutment blocks 96 and 98 mounted thereon while the forward ends of the rods 92 and 94 have resilient abutment blocks 100 and 102 mounted thereon. The plates 80 and 82, the members 88 and 90, the rods 92 and 94 and the blocks 96, 98, 102 and 104 coact to form a cross piece assembly for the second end 46 of the hitch bar assembly 42.

Figure 4:
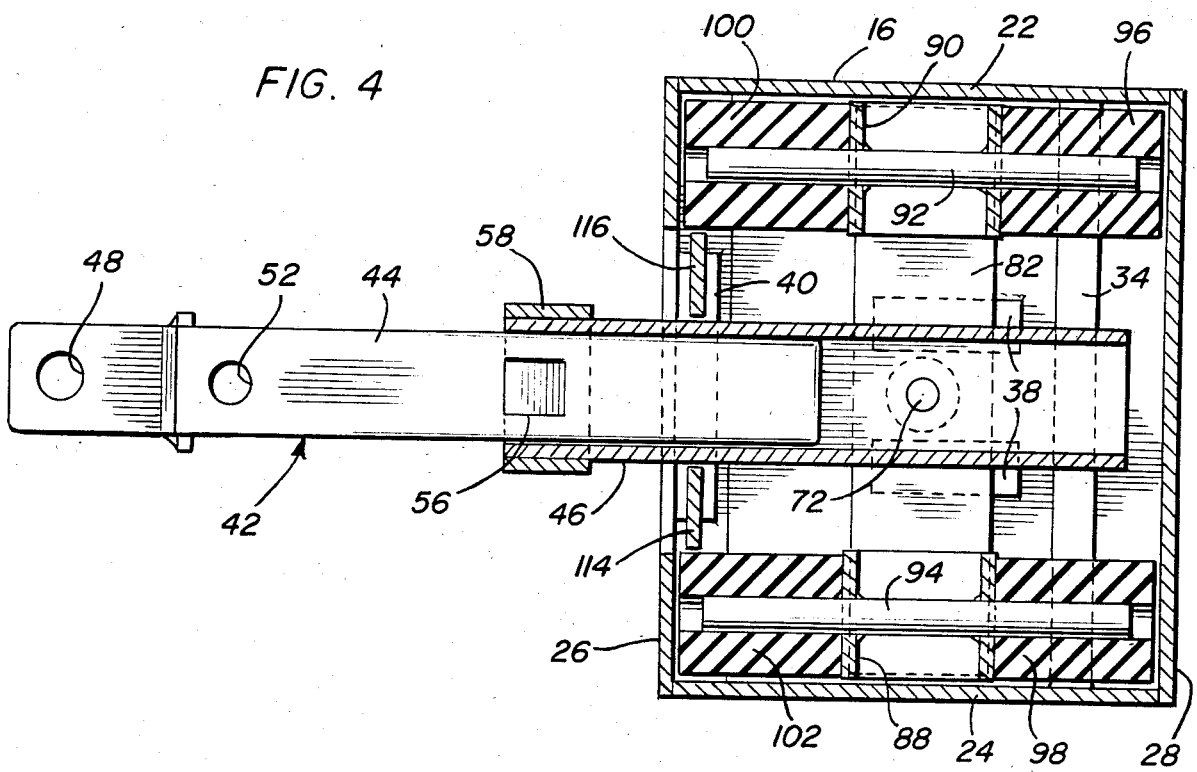
FIG. 4 is a horizontal sectional view taken substantially upon the plane indicated by the section line 4—4 FIG. 2.
Figure 9:
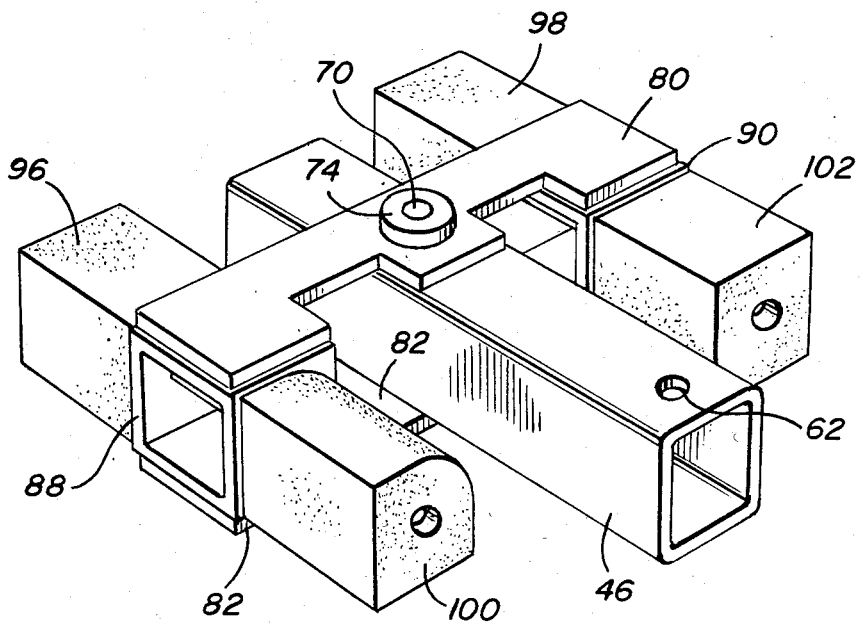
FIG. 9 is a perspective view of the rear end portion of the hitch bar assembly and the resilient blocks supported therefrom.

As may best be seen from FIGS. 4 and 9 of the drawings all of the structure of FIG. 9 except for the foreground end of the second end 46 is received within the housing 16. The abutment blocks 96–102 extend beyond the ends of the rods 92 and 94 and are received between the walls 26 and 28 in slightly compressed condition. In addition, the abutment blocks 96–102 are received between side walls 22 and 24 in slightly compressed condition.

Figure 5:
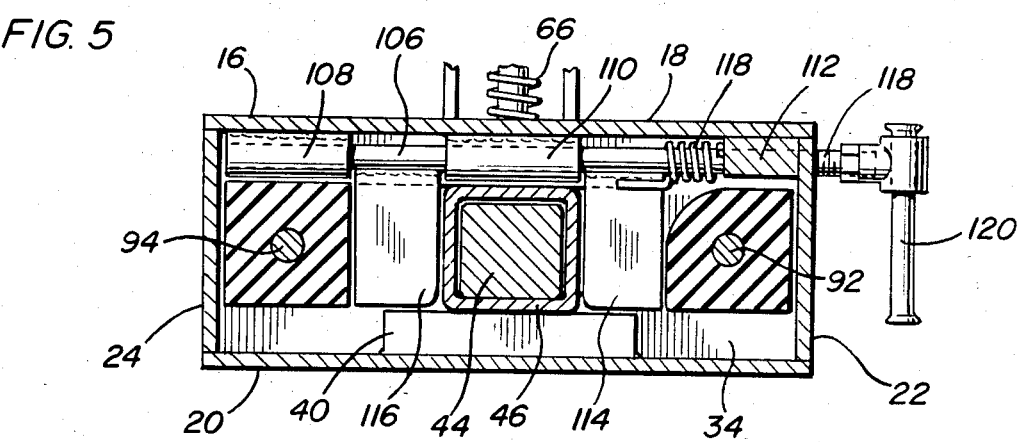
FIG. 5 is a transverse vertical sectional view taken substantially upon the plane indicated by the section line 5—5 of FIG. 2.
Figure 6:
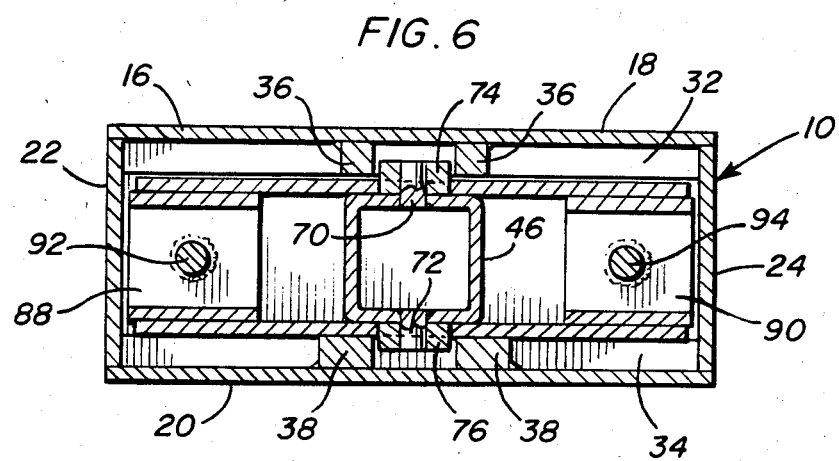
FIG. 6 is a transverse vertical sectional view taken substantially upon the plane indicated by the section line 6—6 of FIG. 2.
Figure 7:
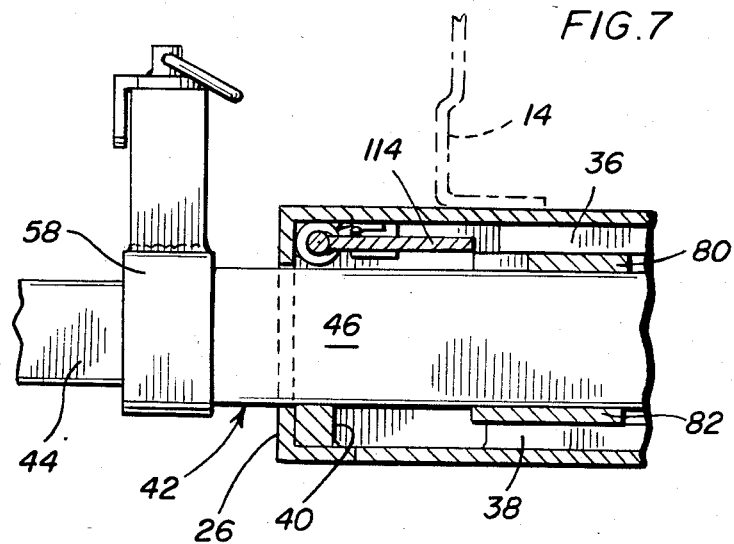
FIG. 7 is an enlarged fragmentary longitudinal vertical sectional view illustrating the latch assembly for preventing lateral swinging of the hitch bar assembly in an inoperative position.
Figure 8:
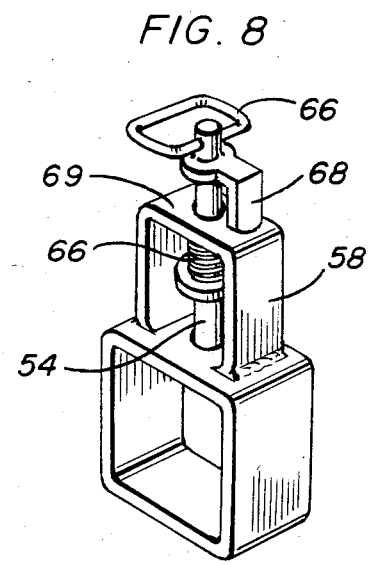
FIG. 8 is a perspective view of the spring biased latch assembly by which the hitch bar assembly may be latched in a retracted operational position.

With attention now invited more specifically to FIGS. 5, 7 and 9, it may be seen that a transverse latch rod 106 is journaled within the housing 16 from journal portions 108, 110 and 112 supported from the underside of the top wall 18. The latch rod 106 includes a pair of generally radial latching flanges 114 and 116 supported therefrom and extending generally radially outwardly thereof on opposite sides of the second end 46 and a torsion spring 118 is encircled about one end portion of the rod 106 and is operatively connected between the flange 114 and the journal portion 112. The torsion spring 108 yieldingly biases the latching rod to a position with the locking flanges 114 and 116 in the operative positions thereof illustrated in FIGS. 4 and 5 of the drawings. However, one end portion 118 of the latching rod 106 projects outwardly through the side wall 22 and has an operating lever 120 mounted thereon whereby the latching lever 120 may be manually angularly displaced in order to angularly displace the latching rod 106 from the position thereof illustrated in FIG. 5 to the position thereof illustrated in FIG. 7 with the flanges 114 and 116 swung upwardly toward inoperative positions.

With attention again invited to FIGS. 4 and 9 of the drawings, it may be seen that when the flanges 114 and 116 are in the latching positions thereof illustrated in FIGS. 4 and 5 the flanges 114 and 116 closely embrace the end portion of the second end 46 in which the first end 44 is telescopingly engaged. Accordingly, the flanges 114 and 116 as well as the snug fit of the bushings 74 and 76 between the guide rods 36 and 38 prevent angular displacement of the hitch bar assembly 42 about the center axes of the pins 70 and 72, the abutment blocks 96–102 serving to yieldingly take up any "slop" clearances.

Figure 1:
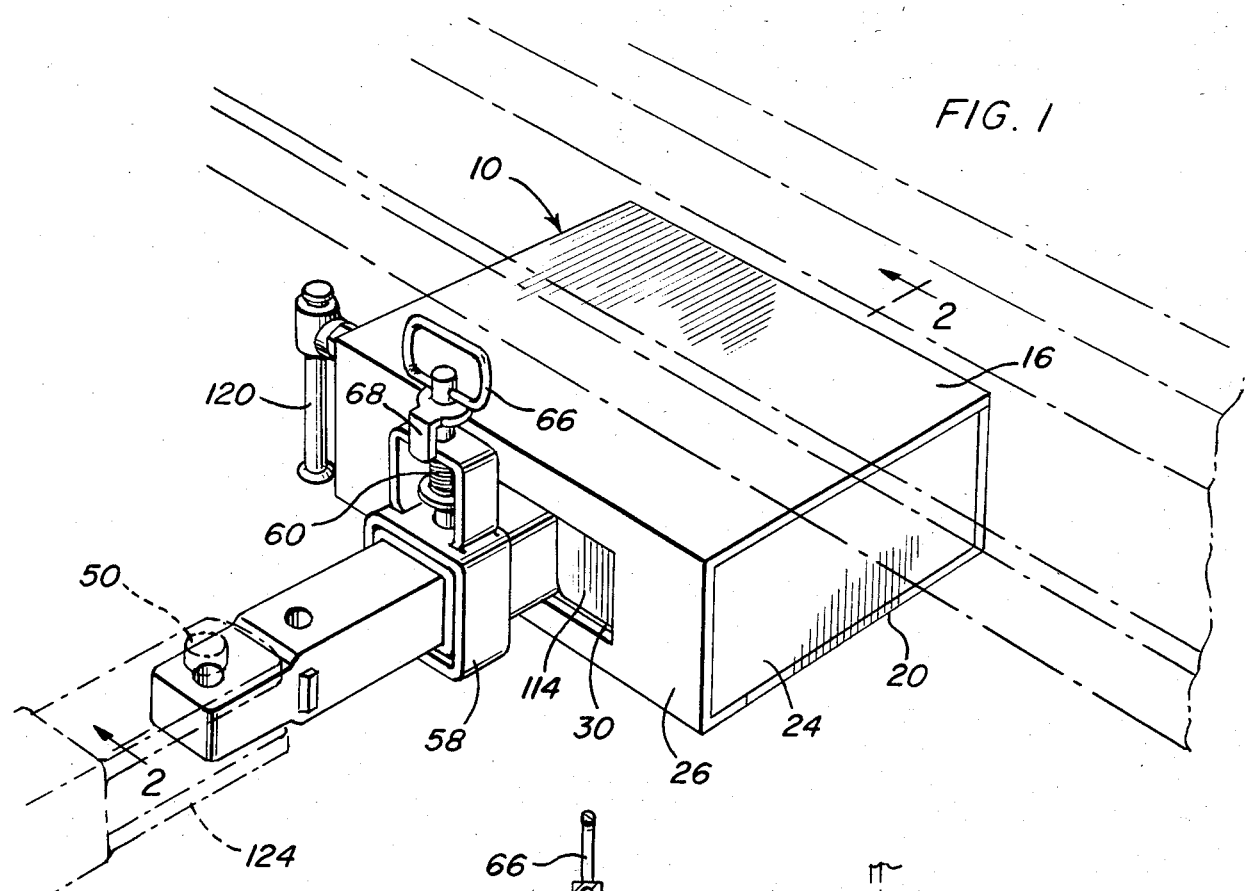
FIG. 1 is a perspective view of the wide range tow hitch shown in operative association with the rear of a towing vehicle.
Figure 2:
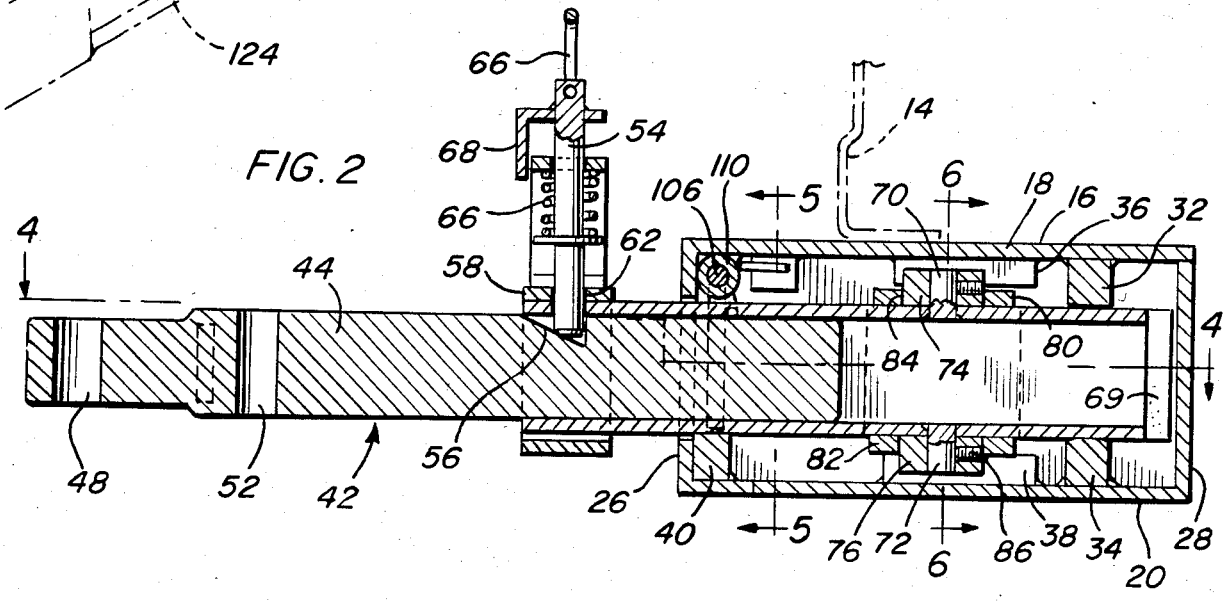
FIG. 2 is an enlarged longitudinal vertical sectional view taken substantially upon the plane indicated by the section line 2—2 of FIG. 1 and with the hitch bar assembly of the tow hitch in an extended position.

However, when the flanges 114 and 116 are in their upwardly retracted positions illustrated in FIG. 7, the second end 46 is free to oscillate about the center axes of the pins 70 and 72 between the limits of oscillation established by opposite side portions of the second end 46 and the extreme lateral ends of the opening 30. Thus, the hitch bar assembly 42 may be angularly displaced between the solid and phantom line positions thereof illustrated in FIG. 10. Further, when the first end 44 is in the extended position thereof illustrated in FIG. 2, a considerably wide range area is available to the extended end of the first end 44 for coupling to the forward tongue portion 124 of a vehicle to be towed through the utilization of the hitch pin 50. Once the towing connection has been made as illustrated in FIG. 1 of the drawings and while the flanges 114 and 116 are in their retracted positions illustrated in FIG. 7 and the first end 44 is still in the extended position, it is merely necessary for the towing vehicle to be moved forwardly in a straight direction in order to enable the hitch bar assembly 42 to swing to a center position, at which time the flanges 114 and 116 will swing down to their latched positions illustrated in FIG. 5 to prevent oscillation of the hitch bar assembly 42 about the center axes of the pins 70 and 72. Then, the towing vehicle may be braked and the momentum of the trailing vehicle then will cause the first end 44 to be displaced to the right as seen in FIG. 2 of the drawings whereupon the latch pin 54 will be cammed out of the notch 56 and ultimately registered with the second bore 52 in order to be extended downwardly thereinto under the biasing action of the compression spring 60 and thus lock the first end 44 in the retracted position thereof illustrated in FIG. 3. Thereafter, the towing vehicle may then again proceed forwardly.

The abutment blocks 96-102 then serve to cushion surge thrusts exerted between the towing vehicle and the vehicle being trailed and further serve to cushion against against that "slop" which may allow some lateral deflection of the outer end of the hitch bar assembly 42 relative to the housing 16.

Further, it is pointed out that the outer terminal end of the first end 44 may be provided with any suitable coupling means other than the first bore 48.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A wide range tow hitch including a base portion for support from the forward end of a vehicle to be towed or the rear end of a towing vehicle, said hitch including an elongated hitch bar assembly having first and second ends, mounting means mounting said second hitch bar end, intermediate its opposite ends, from said base portion for guided front-to-rear lengthwise extension and retraction relative to said base portion and for angular displacement of said rear hitch bar end about an upstanding axis, shiftable forward and rearward with said hitch bar second end, relative to said base portion between opposite limit positions of angular displacement relative to said base portion, bias means yieldingly biasing said second hitch bar end toward a central position between the front and rear limit positions thereof, first latch means operative to releasably latch said second hitch bar end relative to said base portion in a center position of angular displacement between said opposite limit positions of angular displacement, said first end of said hitch bar assembly being mounted from said second end of said hitch bar assembly for front to rear and oscillatory shifting therewith relative to said base portion and for front to rear lengthwise guided shifting relative to said second end between forward and rearward limit positions of shifting thereof, and second latch means operative to releasably latch said first end of said hitch bar assembly in said rearward limit position relative to said second end of said hitch bar assembly.

2. The tow hitch of claim 1 wherein said first latch means includes means operative to automatically latch said second hitch bar end in said center position of angular displacement thereof upon angular displacement of said second hitch bar end to said center position.

3. The wide range tow hitch of claim 1 wherein said second latch means includes means operative to automatically latch said first hitch bar end in the retracted position thereof relative to said second hitch bar end upon movement of said first hitch bar end to said retracted position.

4. The tow hitch of claim 3 wherein said first latch means includes means operative to automatically latch said second hitch bar end in said center position of angular displacement thereof upon angular displacement of said second hitch bar end to said center position.

5. The tow hitch of claim 4 wherein said second latch means also includes means operative to yieldingly resist movement of said first hitch bar end from said retracted position toward said extended position thereof.

6. A tow hitch including a base portion for support from the forward end of a vehicle to be towed or the rear end of a vehicle to be trailed, and tow hitch including an elongated hitch bar assembly including first and second ends, mounting means mounting said hitch bar assembly second end from said base portion with said hitch bar assembly first end projecting outwardly of said base portion and for limited lengthwise shifting of said bar assembly second hitch end relative to said base portion, said first end of said hitch bar assembly being mounted from said second end of said hitch bar assembly for front-to-rear shifting therewith relative to said base portion and for front-to-rear lengthwise guided shifting relative to said second end between forward and rearward limit positions of shifting thereof, latch means operative to releasably latch said first end of said hitch bar assembly in said rearward limit position relative to said second end of said hitch bar assembly, and bias means yieldingly biasing said hitch bar assembly second end toward a center position of lengthwise shifting relative to said base portion.

7. The tow hitch of claim 6 wherein said base portion includes a hollow housing having an opening formed in one side thereof through which said second end of said hitch bar assembly projects, said hitch bar assembly including a cross piece assembly mounted on said hitch bar assembly second end within said housing between said one side of said housing and a second side of said housing opposite said one side, said cross piece assembly including opposite end portions projecting outwardly from opposite sides of said hitch bar assembly second end, said bias means including resilient abutment blocks carried by each of said opposite end portions disposed intermediate the corresponding opposite end portion and said one side and said second side of said housing.

8. A tow hitch including a base portion for support from the forward end of a vehicle to be towed or the rear end of a vehicle to be trailed, said tow hitch including an elongated hitch bar assembly including first and second ends, mounting means mounting said hitch bar assembly second end from said base portion with said hitch bar assembly first end projecting outwardly of said base portion and for limited lengthwise shifting of said bar assembly second hitch end relative to said base portion, bias means yieldingly biasing said hitch bar assembly second end toward a center position of lengthwise shifting relative to said base portion, a hollow housing having an opening formed in one side thereof through which said second end of said hitch bar assembly projects, said hitch bar assembly including a cross piece assembly mounted on said hitch bar assembly second end within said housing between said one side of said housing and a second side of said housing opposite said one side, said cross piece assembly including opposite end portions projecting outwardly from opposite sides of said hitch bar assembly second end, said bias means including resilient abutment blocks carried by each of said opposite end portions disposed intermediate the corresponding opposite end portion and said one side and said second side of said housing, said opposite end portions of said cross piece assembly including laterally outwardly projecting rod ends mounted therefrom projecting toward said one side and said second side of said housing, said resilient abutment blocks having bores formed therethrough and being mounted on said rod ends, said rod ends being shorter than said bores.

9. The tow hitch of claim 8 wherein said housing includes top and bottom walls extending between said one and second sides of said housing and between which said cross piece assembly and resilient blocks are disposed.

10. The tow hitch of claim 9 wherein said top and bottom walls and said cross piece assembly include coacting means guidingly mounting said hitch bar assembly second end within said housing for rectilinear shifting along a path extending between said one and second sides and for angular displacement about an upstanding axis extending between said top and bottom walls and shiftable with said cross piece assembly relative to said housing, said opening being of a greater width than the width of said second end of said hitch, bar assembly whereby the latter may be oscillated about said axis, and first latch means operatively associated with said housing and said second end of said hitch bar assembly operative to releasably lock said hitch bar assembly second end against oscillation relative to said housing.

11. The tow hitch of claim 10 wherein said hitch bar assembly first end is slidingly and guidingly supported from said hitch bar assembly second end for lengthwise extension and retraction relative thereto, said second latch means being operative to releasably lock said hitch bar assembly first end in retracted position relative to said hitch bar assembly second end.

12. The hitch bar assembly of claim 11 wherein said second latch means also includes means operative to yieldingly latch said latch bar assembly first end in extended position relative to said latch bar assembly second end.

* * * * *